(12) United States Patent
Furuhashi et al.

(10) Patent No.: US 7,136,529 B2
(45) Date of Patent: Nov. 14, 2006

(54) INFORMATION PRESENTATION SYSTEM

(75) Inventors: Yukihito Furuhashi, Hachioji (JP); Yuichiro Akatsuka, Tama (JP); Takao Shibasaki, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/227,850

(22) Filed: Sep. 15, 2005

(65) Prior Publication Data
US 2006/0026148 A1 Feb. 2, 2006

Related U.S. Application Data

(63) Continuation of application No. PCT/JP2005/000706, filed on Jan. 20, 2005.

(30) Foreign Application Priority Data
Jan. 20, 2004 (JP) ............................. 2004-012366

(51) Int. Cl.
*G06K 9/62* (2006.01)
*G06F 7/00* (2006.01)

(52) U.S. Cl. ............... 382/209; 707/3; 707/104.1; 382/217

(58) Field of Classification Search ........ 382/209–223; 707/3–10, 104.1
See application file for complete search history.

(56) References Cited

U.S. PATENT DOCUMENTS

| | | | |
|---|---|---|---|
| 6,167,517 A | 12/2000 | Gilchrist et al. | |
| 6,633,873 B1 * | 10/2003 | Nakamura | 707/10 |
| 6,760,720 B1 * | 7/2004 | De Bellis | 707/3 |
| 2003/0133613 A1 * | 7/2003 | Ono | 382/209 |
| 2004/0122807 A1 * | 6/2004 | Hamilton et al. | 707/3 |

FOREIGN PATENT DOCUMENTS

| | | |
|---|---|---|
| JP | 2001-75980 | 3/2001 |
| JP | 2003-323440 | 11/2003 |

OTHER PUBLICATIONS

Wagner, Daniel et al., "First Steps Towards Handheld Augmented Reality", Proceedings of the Seventh IEEE International Symposium on Wearable Computers (2003), pp. 127-135.

(Continued)

*Primary Examiner*—Jingge Wu
*Assistant Examiner*—Aaron Carter
(74) *Attorney, Agent, or Firm*—Scully, Scott, Murphy & Presser PC

(57) ABSTRACT

An information presentation system includes a template matching unit which performs template matching between input information and a template group stored, a plurality of associated information search units which search for associated information on the basis of a matching result of the template matching unit, an information processing unit which processes output information in accordance with the input information, the matching result of the template matching unit, and a search result of the associated information search units, an output unit which outputs the information processed by the information processing unit, a template selection unit which causes a user to select a template group, and a template supply unit which transmits, to the template storage unit, the template group selected by the template selection unit from predetermined template groups. The template supply unit is arranged independently of the plurality of associated information search units.

8 Claims, 9 Drawing Sheets

OTHER PUBLICATIONS

Klautau, Aldebaro et al., "Server-Assisted Speech Recognition Over the Internet", Proceedings of the IEEE International Conference on Acoustics, Speech, and Signal Processing (2000), pp. 3690-3693.

Isobe, Yoshiaki et al., "Development of Personal Authentication System Using Fingerprint with Digital Signature Technologies", Proceedings of the 34th Annual Hawaii International Conference on System Sciences (2001), pp. 4039-4047.

* cited by examiner (A) Weight display
(B) Display reflecting only posture
(C) Display reflecting only position on map

INFORMATION PRESENTATION SYSTEM

CROSS-REFERENCE TO RELATED APPLICATIONS

This is a Continuation Application of PCT Application No. PCT/JP2005/000706, filed Jan. 20, 2005, which was published under PCT Article 21(2) in Japanese.

This application is based upon and claims the benefit of priority from prior Japanese Patent Application No. 2004-012366, filed Jan. 20, 2004, the entire contents of which are incorporated herein by reference.

BACKGROUND OF THE INVENTION

1. Field of the Invention

The present invention relates to an information presentation system.

2. Description of the Related Art

Japanese Patent No. 3225882 discloses a method of performing template matching on a terminal side to extract and superpose necessary information in a scene labeling system including a server and an information presentation terminal connected to the server via a communication channel.

BRIEF SUMMARY OF THE INVENTION

According to a first aspect of the present invention, there is provided an information presentation system which includes a server and an information presentation terminal connected to the server via a communication channel and which uses template matching, comprising:

an information input unit which inputs information serving as a target of the template matching;

a template storage unit which stores a template group;

a template matching unit which performs template matching between the information input from the information input unit and the template group stored in the template storage unit;

a plurality of associated information search units which search for associated information on the basis of a matching result of the template matching unit;

an information processing unit which processes output information in accordance with the information input from the information input unit, the matching result of the template matching unit, and a search result of the associated information search units;

an output unit which outputs the information processed by the information processing unit;

a template selection unit which causes a user to select a template group; and a template supply unit which transmits, to the template storage unit, the template group selected by the template selection unit from predetermined template groups, wherein the template supply unit is arranged independently of the plurality of associated information search units.

According to a second aspect of the present invention, there is provided an information presentation system according to a first aspect of the present invention, wherein the template groups are classified preferably depending on time and/or a position of the information presentation terminal.

According to a third aspect of the present invention, there is provided an information presentation system according to a first aspect of the present invention, wherein the template groups are preferably based on symbols which express at least a shop, facility, and a specific area, and classified in accordance with at least a function expressed by a symbol, a type of business, a type of user serving as a target.

According to a fourth aspect of the present invention, there is provided an information presentation system according to a first aspect of the present invention, wherein the template supply unit preferably automatically transmits the template group to the information presentation terminal in accordance with the time and/or the position of the information presentation terminal.

According to a fifth aspect of the present invention, there is provided an information presentation system according to a first aspect of the present invention, wherein charging is made preferably depending on supply of a template group from the template supply unit to the information presentation terminal.

According to a sixth aspect of the present invention, there is provided an information presentation system according to a first aspect of the present invention, which preferably further comprises a server template storage unit which stores a template group used in the information presentation system, and a server template matching unit which performs template matching between the information input from the information input unit and the template group stored in the server template storage unit, and in which the associated information search units search for the associated information on the basis of a result in the server template matching unit and transmits information corresponding to the search result.

According to a seventh aspect of the present invention, there is provided an information presentation system according to a sixth aspect of the present invention, wherein when matching in the server template matching unit is successful and associated information search in the associated information search units is successful, the associated information search units preferably transmit to the information presentation terminal information expressing that the associated information is present in a template not stored in the template storage unit.

According to an eighth aspect of the present invention, there is provided an information presentation system according to a sixth aspect of the present invention, wherein when matching in the server template matching unit is successful and associated information search in the associated information search units fails, the associated information search units preferably transmit to the information presentation terminal information expressing that a template to which information is not associated is present.

DETAILED DESCRIPTION OF THE IVENTION

An embodiment of the present invention will be described with reference to the accompanying drawings.

(First Embodiment)

Figure 1:
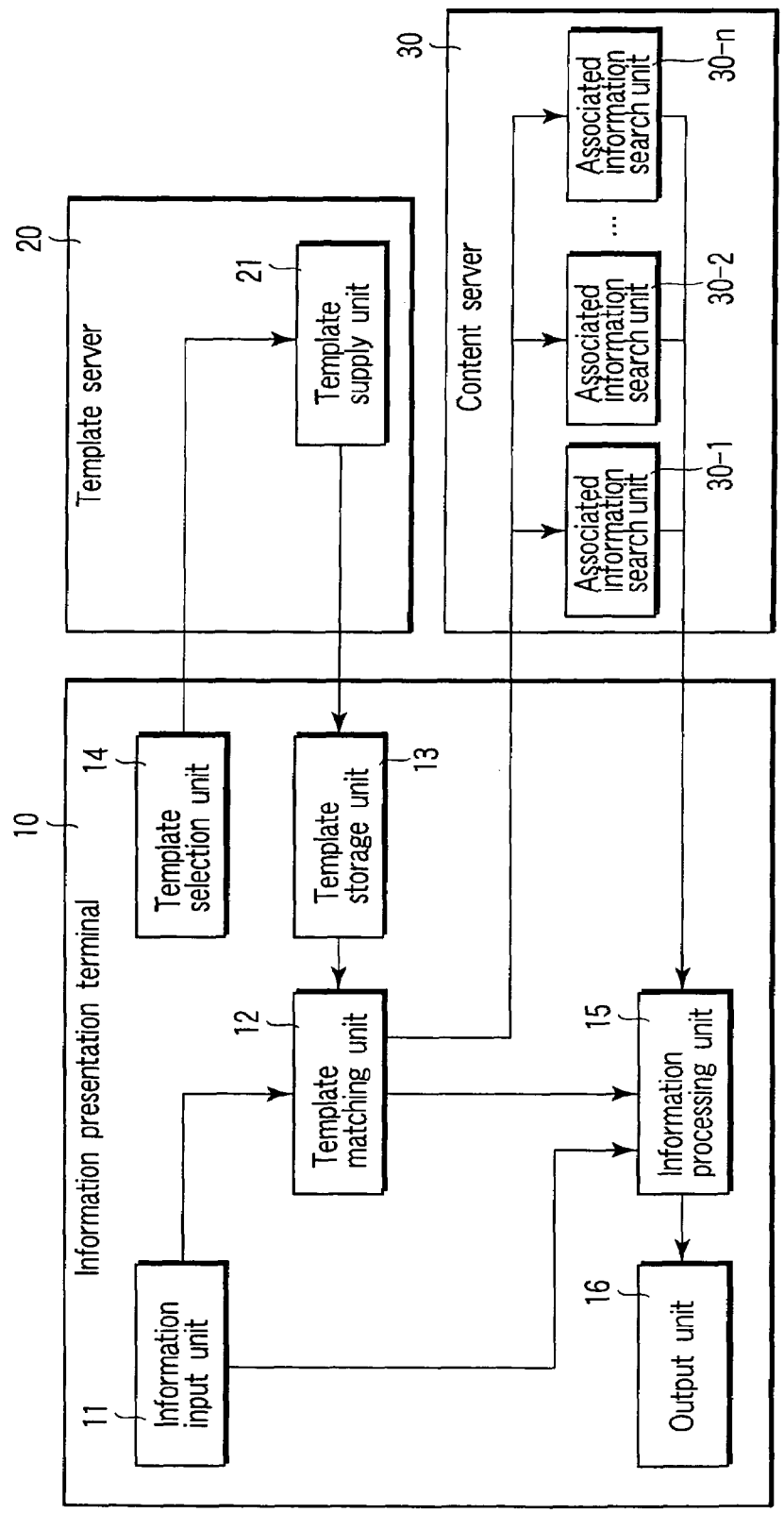
FIG. 1 is a block diagram of an information presentation system according to an embodiment of the present invention.

FIG. 1 is a block diagram showing the arrangement of an information presentation system according to the first embodiment of the present invention. The information presentation system according to this embodiment comprises an information presentation terminal 10, template server 20, and content server 30. In the system, image information is input, associated information is superposed on the input image information, and the resultant information is displayed.

The information presentation terminal 10 comprises an information input unit 11 such as a camera, a template matching unit 12 which performs template matching with the image input from the information input unit 11, an information processing unit 15 which calculates the position and posture of the information presentation terminal 10 in accordance with the result from the template matching unit 12 and outputs the information, an output unit 16 such as a display for displaying the information, a template storage unit 13 which stores a template group serving as the base of template matching, and a template selection unit 14 which selects a template group to be stored in the template storage unit 13. The information presentation terminal 10 is provided in the form of a cellular phone or a PDA with a communication function. This communication function allows the template server 20 and content server 30 to exchange data between them.

The template server 20 comprises a template supply unit 21 which transmits a template group on the basis of the selection information from the template selection unit 14 in the information presentation terminal 10. Note that the template supply unit 21 includes a storage unit (not shown in FIG. 1) which can be accessed by this system and stores a predefined template group. A template includes position information corresponding to the template in addition to template data used for template matching. These data include a data set having a template image, 3D coordinates at which the template image is located, latitudes, and longitudes. The template server 20 has a communication function and can exchange data with the information presentation terminal 10.

The content server 30 comprises a plurality of associated information search units 31-1 to 31-n which search for associated information on the basis of the matching result of the template matching unit 12 in the information presentation terminal 10. The template supply unit 21 is arranged independently of the associated information search units 31-1 to 31-n.

Note that, although not shown in FIG. 1, the associated information search units 31-1 to 31-3 search for information including various kinds of information associated with templates, such as 3D object shape data, moving images, still images, text information, and URLs. The content server 30 also has a communication function and can exchange data with the information presentation terminal 10. In this embodiment, although the plurality of associated information search units 31-1 to 31-n are arranged in one content server 30, every arbitrary number of ones of the plurality of associated information search units 31-1 to 31-n may be arranged across a plurality of content servers.

Figure 2:
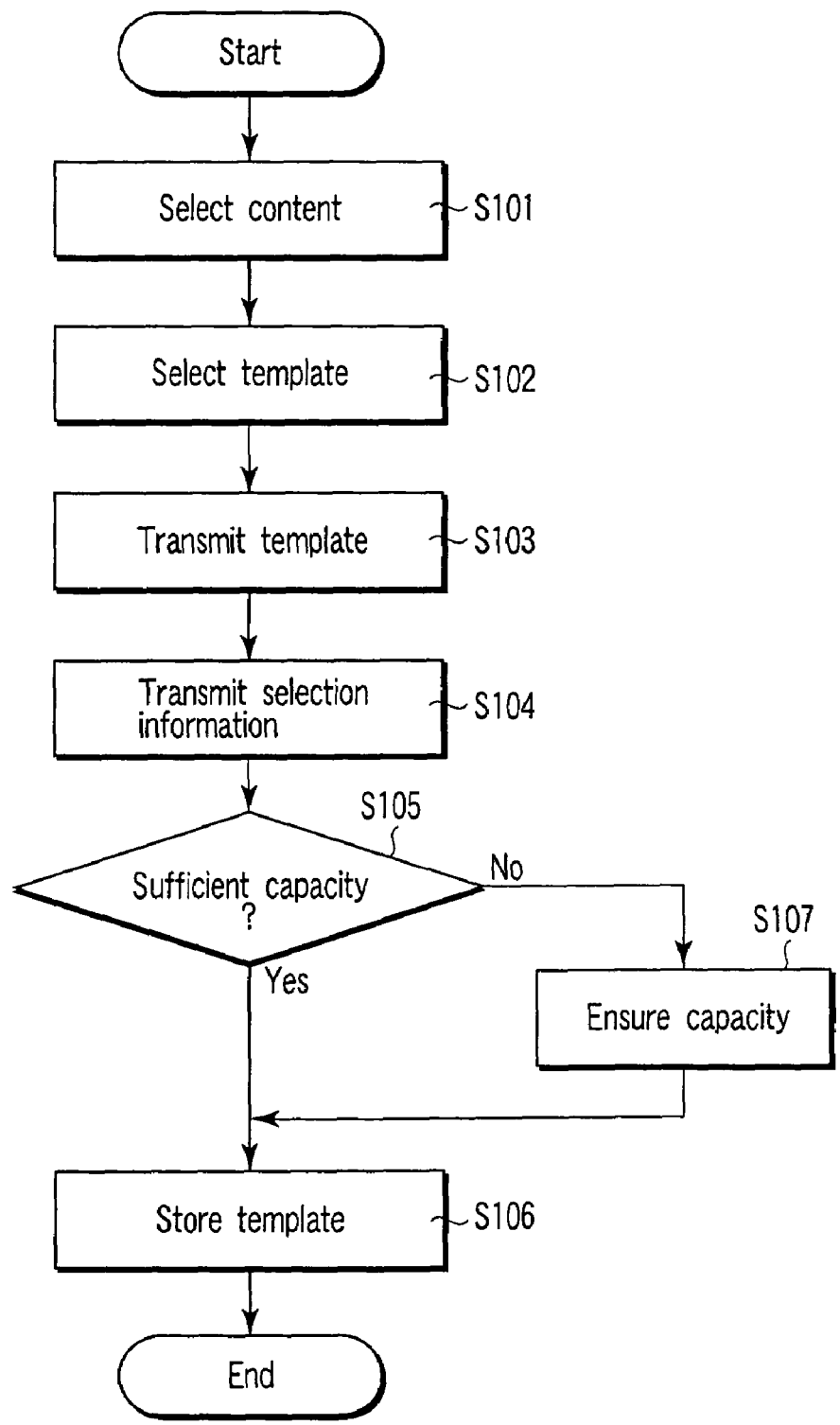
FIG. 2 is a flowchart showing a processing (template selection) flow of the information presentation system.
Figure 3:
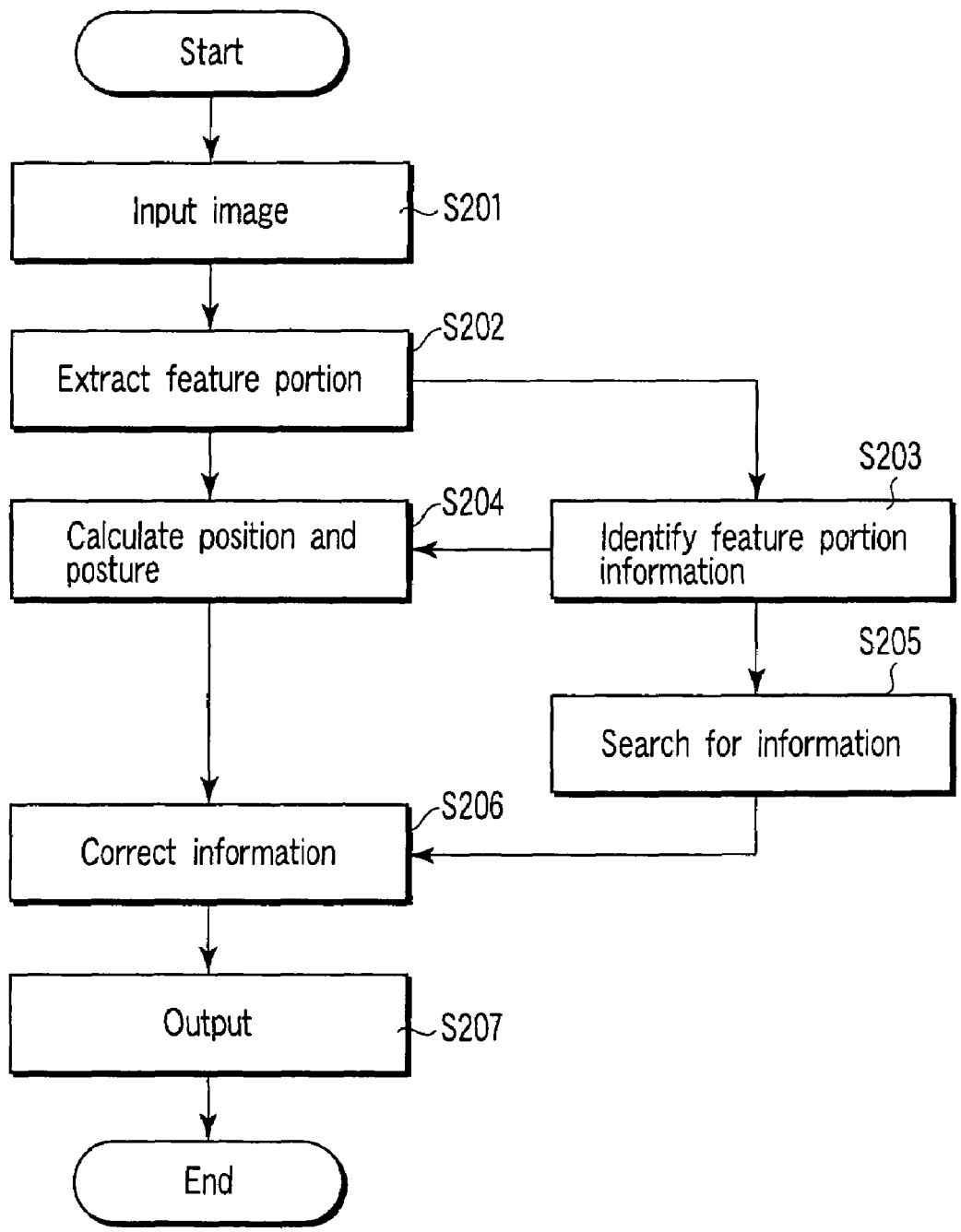
FIG. 3 is a flowchart showing a processing (information presentation) flow of the information presentation system.

Operations of the information presentation terminal 10, template server 20, and content server 30 in the information presentation system having the above arrangement will now be described with reference to the flowcharts of FIGS. 2 and 3.

Operation of template selection will be described first with reference to FIG. 2. A user selects at least one content prepared by this system from the menu on a display device by using the template selection unit 14 in the information presentation terminal 10 (step S101).

Figure 7:
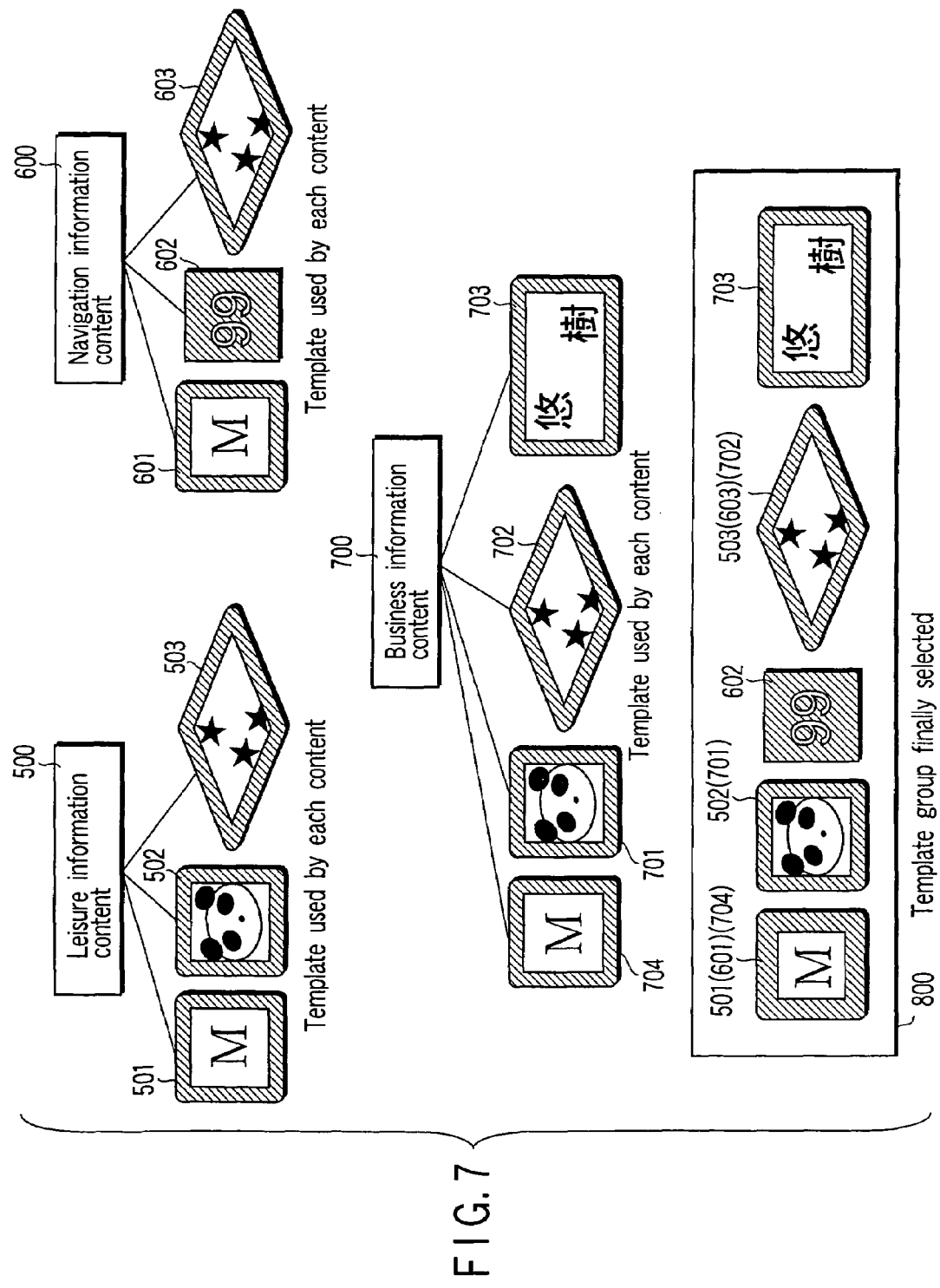
FIG. 7 is a view for explaining a sequence for forming a template group by integrating overlapping templates.

The template selection unit 14 selects a template group used by the content selected by the user in step S101 (step S102). At this time, when the user selects a plurality of contents in step S101, the template selection unit 14 extracts template groups used by the respective contents. In this case, as shown in FIG. 7, the template selection unit 14 integrates overlapping templates as one template and forms a template group excluding overlapping elements. If there are templates 501, 502, and 503 used by a leisure information content 500, templates 601, 602, and 603 used by a navigation information content 600, and templates 701, 702, 703, and 704 used by a business information content 700, overlapping templates are integrated into single templates (the templates 501, 601, and 701 are integrated into one template, and the templates 503, 603, and 702 are similarly integrated into one template), thereby obtaining a finally selected template group 800.

The template selection unit 14 then transmits information of the selected template group to the template supply unit 21 in the template server 20 (step S103). The template supply unit 21 selects the corresponding template group from a storage unit (not shown) on the basis of the received template group information and transmits the selected template group to the template storage unit 13 in the information presentation terminal 10 (step S104).

The template storage unit 13 confirms whether it has a capacity enough to store the received template group (step S105). The storage capacity is limited by not only the physical capacity as hardware on the information presentation terminal 10, but also the internal condition of the system. For example, the storage capacity may change depending on the grade of content subscription contract.

In this case, when the storage capacity is sufficiently ensured, the received template group is stored (step S106).

When the storage capacity is hot enough, an already stored template group is erased to ensure the capacity (step S107). At this time, all the already stored template groups may be erased. Old templates may be chronologically erased such that overlapping templates between the already stored template groups and newly received template group are so integrated as to fit the resultant template group in the storage unit.

After the enough capacity is ensured in step S107, the template storage unit 13 stores the received template group (step S106).

Figure 8:
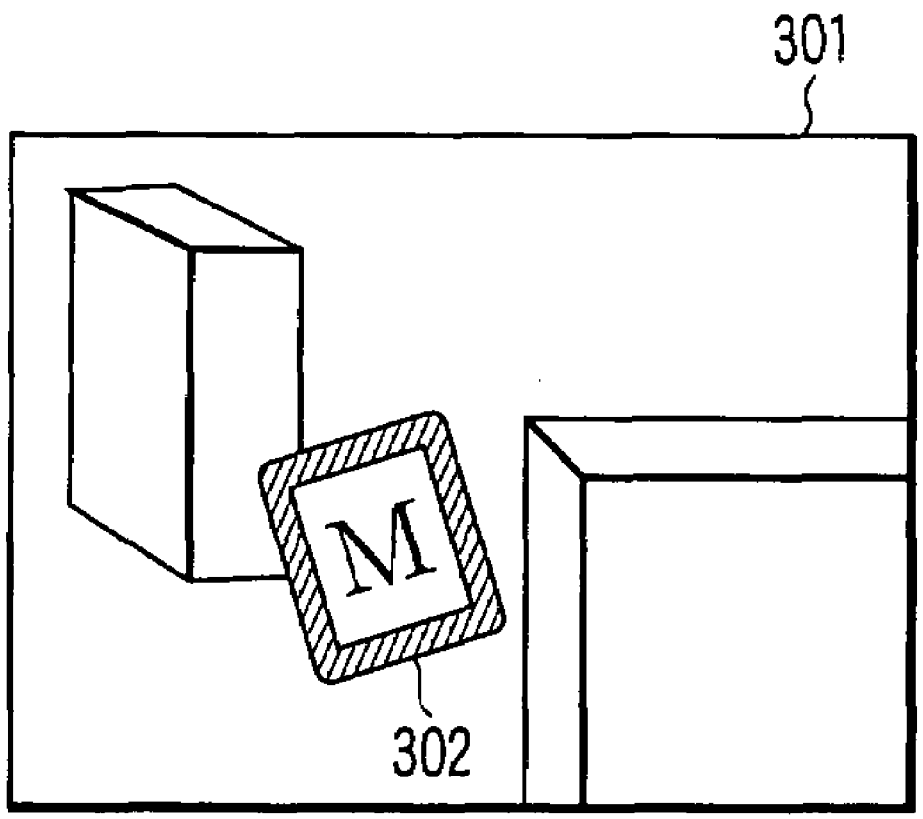
FIG. 8 is a view showing an image input to an information input unit.

Operation of information presentation will be described with reference to FIG. 3. The information input unit 11 photographs an image containing a signboard 302 shown in FIG. 8 (step S201). For example, an input image 301 shown in FIG. 8 is obtained.

The template matching unit 12 extracts from the input image 301 a feature portion to be used for template matching (step S202). For example, four corner points and an internal area are extracted from the signboard 302.

In this embodiment, the "feature portion" is defined as a photographable portion whose position can be specified by the image. The feature portion includes a feature area, feature point, and feature line segment. For example, if a black square frame surrounding a letter is used as a marker, the vertices of the four corners of the black frame, a line segment of the black frame, an image of the letter surrounded by the black frame can be used as feature portions. The feature portion may be a street signboard or sign. In addition, registered shape information such as a surface shape of a known set object such as a table can also be used as a feature portion.

The template matching unit 12 then performs template matching for the above feature portion (step S203). As a result, the signboard 302 contained in the input image 301 is identified to obtain the 3D information of the signboard 302.

The template matching unit 12 calculates the 3D position and posture of the information presentation terminal 10 on the basis of the 3D information of the signboard 302 and the feature point information for position/posture calculation of the above feature portion (step S204).

In the 3D position and posture calculation in step S204, the position and posture relative to a space in which the marker is defined are calculated on the basis of the coordinate information of the feature portion extracted by the template matching unit 12 and the marker coordinate information determined by the template matching unit 12. In this case, three or more feature portions must be specified. Note that the method described in, e.g., Jpn. Pat. Appln. KOKAI Publication Nos. 2000-227309 and 2001-126051 is used for a technique for calculating the position and posture of the feature portion (feature point of marker).

The associated information search units 31-1 to 31-n search for associated information on the basis of the template information identified in the template matching unit 12 (step S205). The associated information includes, e.g., 3D objects arranged relative to templates and annotation information around templates.

Figure 9:
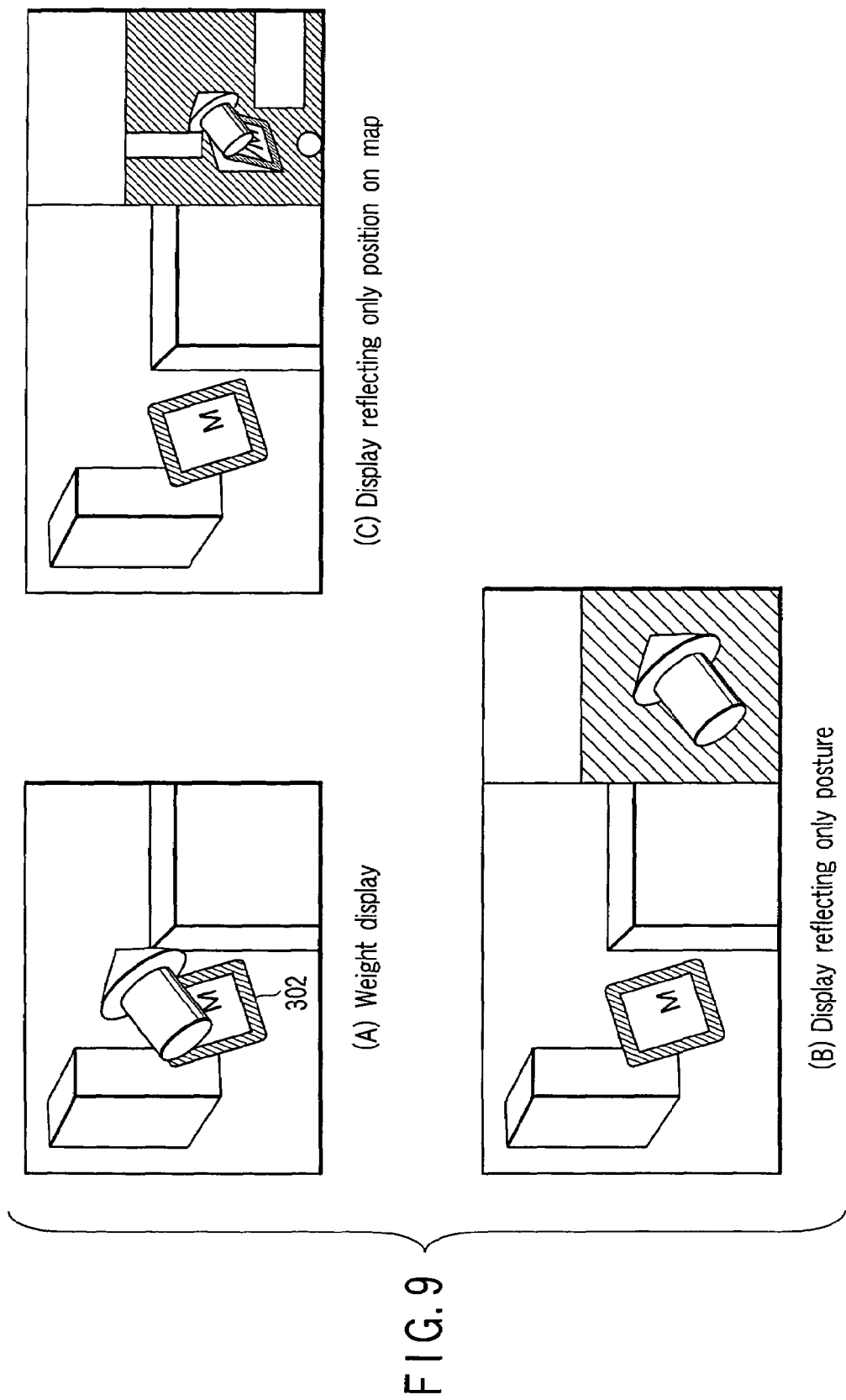
FIG. 9 shows views for explaining a process in an information processing unit.

On the basis of the 3D position and posture of the information presentation terminal 10 which are the calculation result of the template matching unit 12, the information processing unit 15 processes the input image 301 photographed by the information input unit 11 and the associated information as a result of search of the associated information search units 31-1 to 31-n (step S206). This processing includes a process for projecting and converting a 3D object serving as the associated information on the basis of the 3D position and posture of the information presentation terminal 10, as shown in FIG. 9(A). The processing also includes a process for projecting and converting a 3D object serving as the associated information on the basis of the 3D position and posture of the information presentation terminal 10 and locating near the input image 31 the 3D object reflecting only the posture component of the projection and conversion result, as shown in FIG. 9(B). The processing further includes a process for projecting and converting the 3D object serving as the associated information on the basis of the 3D position and posture of the information presentation terminal 10 and locating near the input image 31 the 3D object reflecting only the position component of the projection and conversion result, as shown in FIG. 9(C).

The output unit 16 then outputs the processing result of the information processing unit 15 to the user. (step S207). For example, if the processing result of the information processing unit 15 is a superposed image of the input image 301 and the associated information, the superposed image is displayed on the display.

In this case, the user may use a plurality of content servers, i.e., the user may use a plurality of independent content providers.

An independent content provider conventionally defines templates of contents of its own. The templates corresponding to the signboard 302 must be held in number equal to the number of contents providers even if the contents are associated with the same signboard 302. This makes use efficiency of the system resources low.

In this system, however, since the templates are provided independently of content providers, each information can be associated with identical templates of the plurality of independent content providers, thereby efficiently using the system resources.

A template supplier may charge a template fee to each content provider. The template fees change depending on the use frequency determined by a combination of the quantity of templates and the design/character/notation.

A detailed use example of the first embodiment described above will be described below. A practical use example of the first embodiment is an application to a content display system using a cellular phone with a camera. That is, a cellular phone serves as the information presentation terminal 10, and a camera serving as the information input unit 11 is connected to the cellular phone.

To use this system, the user selects a use content from a menu on the cellular phone. For example, the user selects "leisure information", "navigation information", and "business information" menus of a "convenience store template". A template group to be used for these contents is sent via the template server 20. In this case, the signboard 302 of the convenience store is registered as a template in the "leisure information" "navigation information", and "business information" contents. (501, 601, and 704 in FIG. 7). The respective content providers described above create contents independently, but a common template can be used because the content providers are unified. That is, the user can connect to three contents using one template.

The quantity of template groups stored in the main body of the cellular phone at the time of reception of the template depends on the subscription contract of this system. When the user uses this system in a trial contract, the cellular phone can store a maximum of 10 templates. However, when the user makes a standard contract of ¥100 per month, the cellular phone can store a maximum of 50 templates. When the user makes a business contract of ¥300 per month, the cellular phone can store templates up to the maximum capacity of the information presentation terminal 10 including an external storage device.

The user is charged depending on the quantity of template groups received from the template server 20. The charging system may depend on, e.g., a monthly charge with an unlimited download amount. Alternatively, the monthly charge may limit the download amount of 50 pieces/month, and 51 or more pieces may be charged ¥0.5/piece.

The camera photographs a location around the signboard 302 as in the input image 301 shown in FIG. 8. The template matching unit 12 operates on the cellular phone, extracts feature portions such as the four corners and portions inside the signboard from the input image photographed by the camera, and performs template matching. The template matching unit 12 uses the communication function of the cellular phone and transmits the matching result to the content server 30. In this case, the user selects a desired one of the "leisure information", "navigation information", and "business information" from the menu on the display, thereby selecting the content server 30 serving as the transmission destination.

Since a cellular phone generally has a limited storage capacity, it is difficult to store a large number of template groups. In this system, since a desired item can be selected from the menus of the plurality of content providers by using one template corresponding to the signboard 302, the limited storage capacity can be efficiently used.

In this embodiment, the "convenience storage template set" is exemplified as a template set. This is a template group in which the signboard of the convenience store is registered. Business form-specific, function-specific, installation location-specific, assumed user-specific, weather condition-specific template groups such as a "bank set", "fast food set", "street sign set", "vending machine set", "40s male set", "fine day walking set" are assumed.

Figure 4:
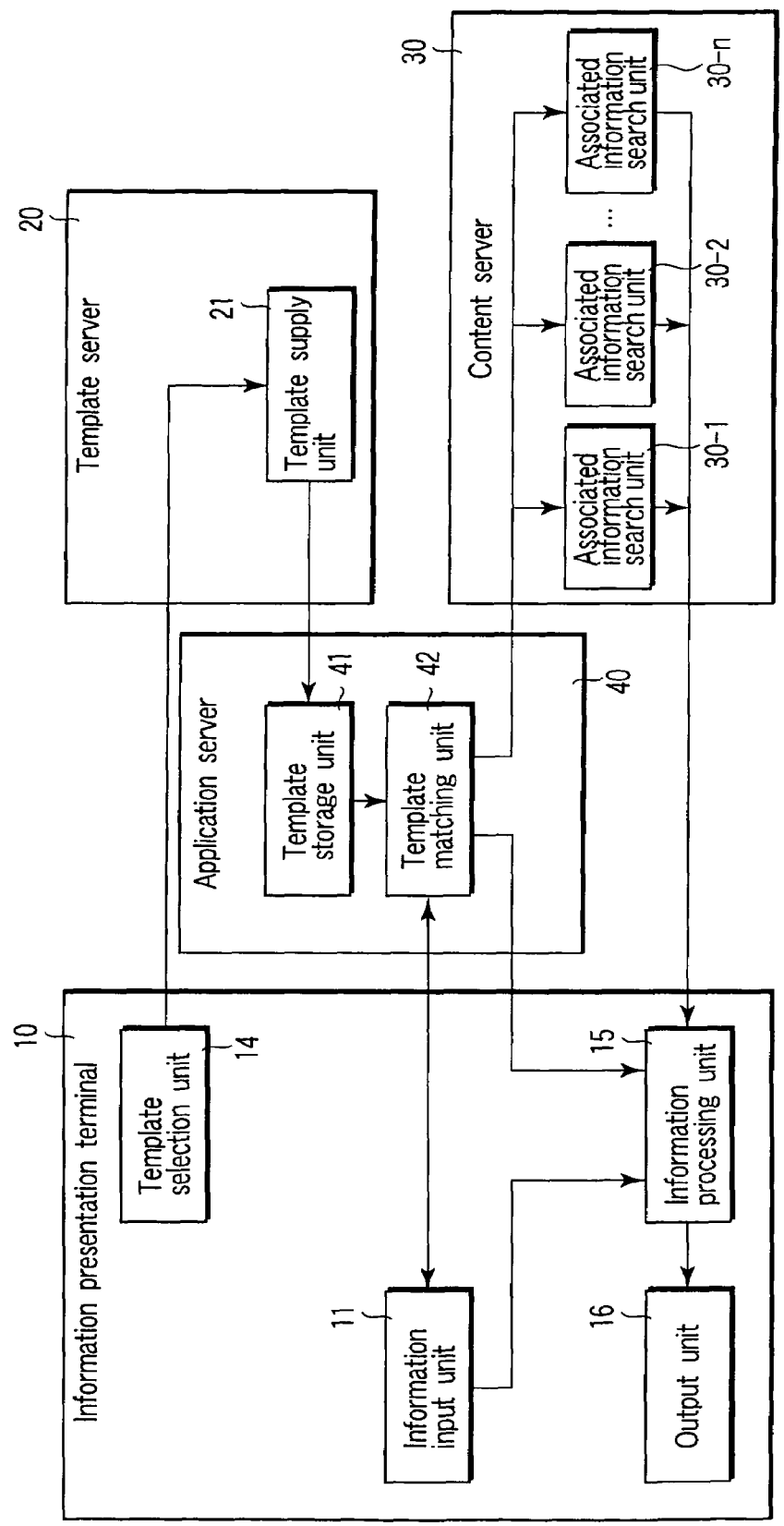
FIG. 4 is a block diagram showing the first modification of the arrangement of the information presentation system.

As shown in FIG. 4, the template storage unit 41 and template matching unit 42 may be separated on the application server 40. Assume that the information presentation terminal 10 is a cellular phone. In this case, since the cellular phone has only a comparatively limited calculation power, in order to increase the response speed of the system, it is effective to assign to an external server the portion which has a large calculation amount, such as the template matching unit 42. Even in this case, the template supply unit 21 is present independently of the template matching unit 42 and associated information search units 31-1 to 31-n, and a common template group is provided. This brings about the effects described in the above embodiment.

(Second Embodiment)

Figure 5:
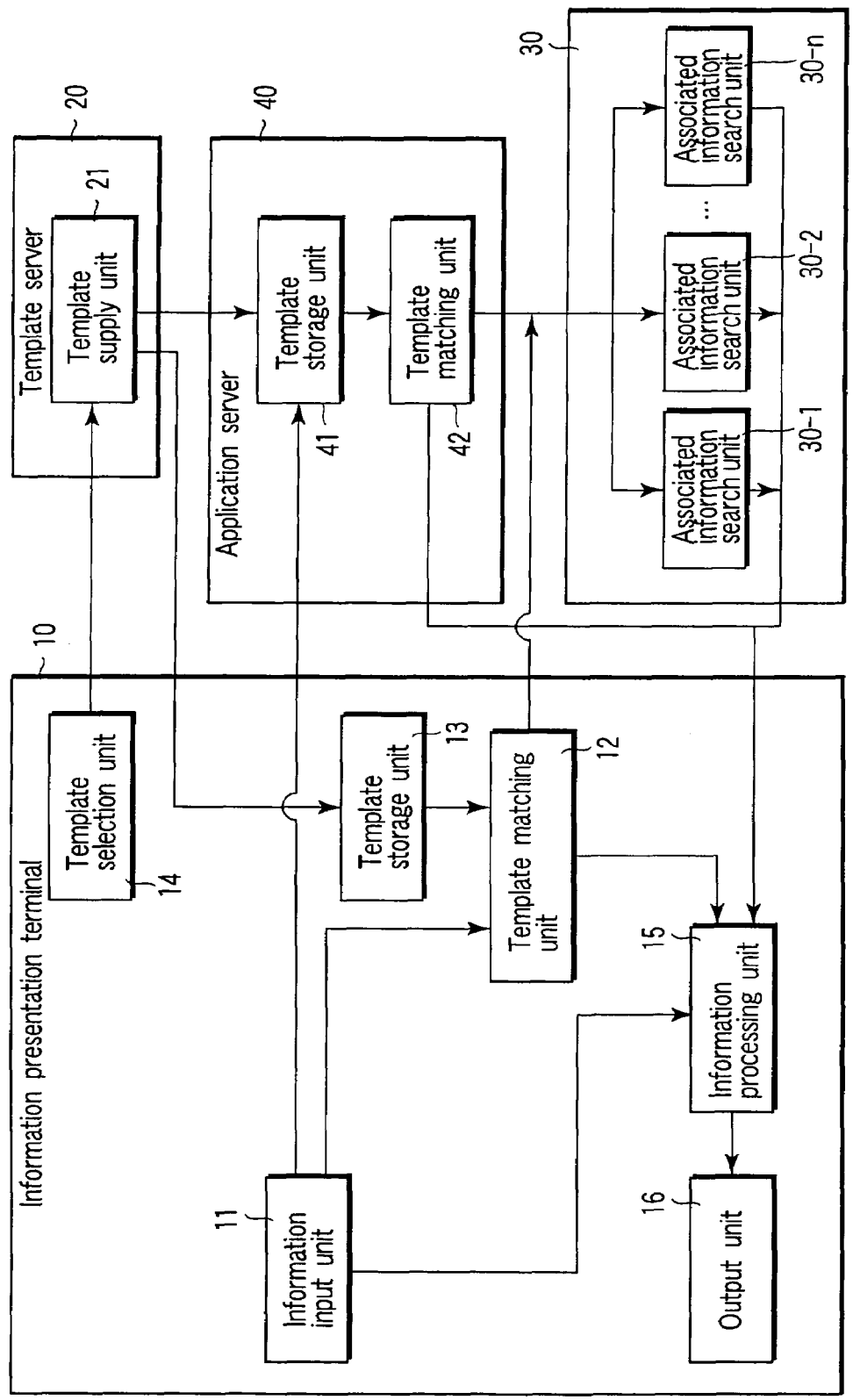
FIG. 5 is a block diagram showing the second modification of the arrangement of the information presentation system.

The second embodiment of the present invention will be described. In an information presentation system of this embodiment, an application server 40 is added to the arrangement of the first embodiment, as shown in FIG. 5. The application server 40 comprises a server template storage unit 41 and server template matching unit 42.

The server template storage unit 41 stores all templates received from the template supply unit 21 and used by this system. The application server provider is charged depending on the template supply quantity. For example, if a contract is made such that the template information stored in the server template storage unit 41 is always updated to the latest information, charging is made depending on the number of downloaded templates.

The server template matching unit 42 performs the same processing as in the template matching unit 12 in the information presentation terminal 10.

Figure 6:
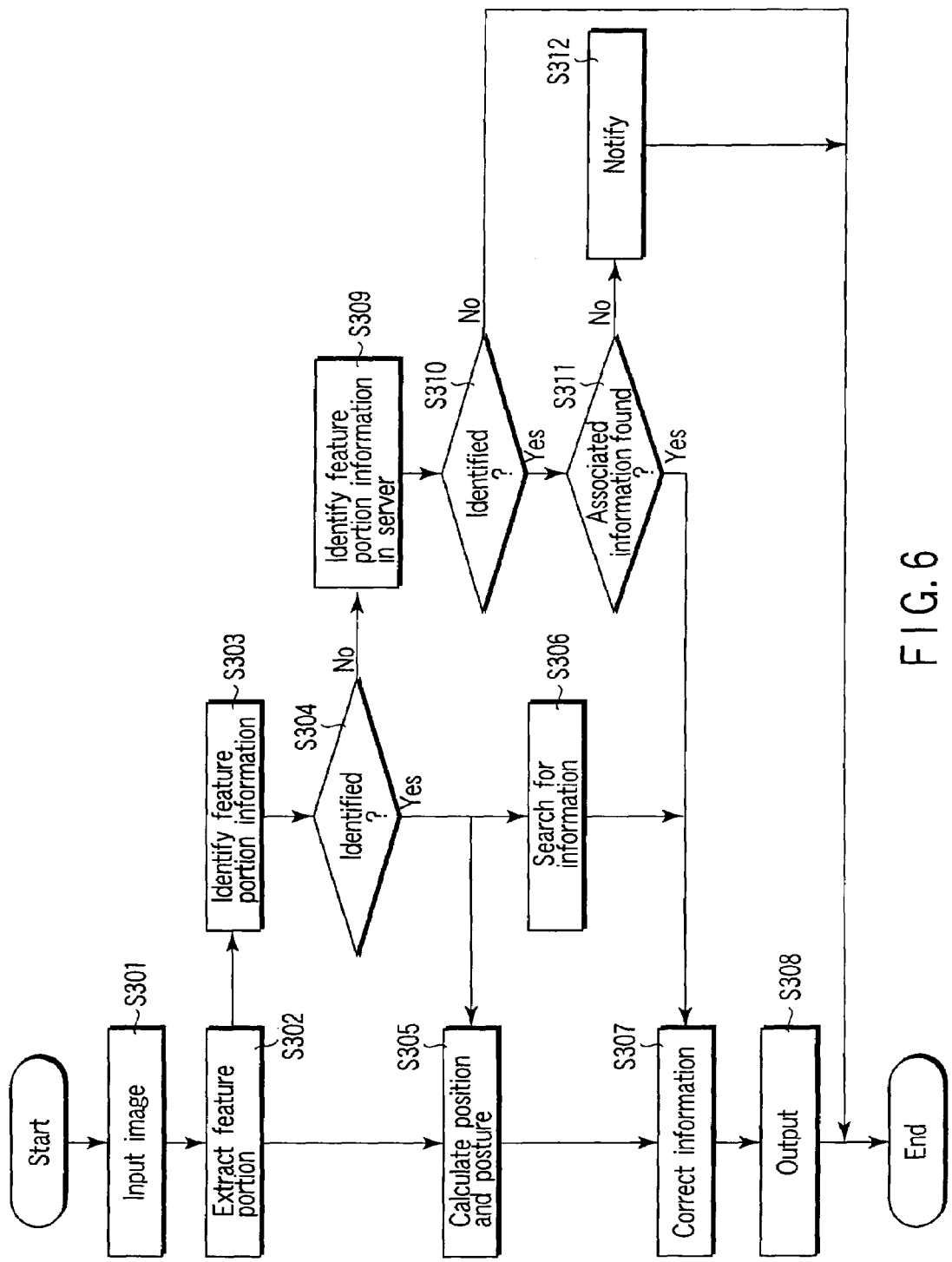
FIG. 6 is a flow chart showing a processing (information presentation) flow corresponding to the arrangement of FIG. 5 in the information presentation system.

Operations of the information presentation terminal 10, a content server 30, and the application server 40 in the information presentation system having the above arrangement will be described with reference to the flowchart in FIG. 6.

An information input unit 11 photographs an image including a signboard 302 shown in FIG. 8 (step S301). For example, an input image 301 shown in FIG. 8 is obtained.

The template matching unit 12 extracts from the input image 301 a feature portion to be used for template matching (step S302). For example, four corner points and an internal area are extracted from the signboard 302.

In this embodiment, the "feature portion" is defined as a photographable portion whose position can be specified by the image. The feature portion includes a feature area, feature point and feature line segment. For example, if a black square frame surrounding a letter is used as a marker, the vertices of the four corners of the black frame, a line segment of the black frame, an image of the letter surrounded by the black frame can be used as feature portions. The feature portion may be a street signboard or sign. In addition, registered shape information such as a surface shape of a known set object such as a table can also be used as a feature portion.

The template matching unit 12 then performs template matching for the above feature portion (step S303). It is determined in step S304 whether template matching is successful. If YES in step S304, i.e., if the system identifies the signboard 302 contained in the input image, the template matching unit 12 obtains 3D information of the signboard 302. The template matching unit 12 calculates a 3D position and posture of the information presentation terminal 10 in accordance with the 3D information of the signboard 302 and the feature point information of the feature portion which is used to calculate the position and posture (step S305).

Associated information search units 31-1 to 31-n search for associated information on the basis of the template information identified in the template matching unit 12 (step S306). The associated information includes, e.g., 3D objects arranged relative to templates and annotation information around templates.

On the basis of the 3D position and posture of the information presentation terminal 10 which are the calculation result of the template matching unit 12, an information processing unit 15 processes the input image 301 photographed by the information input unit 11 and the associated information as a result of search of the associated information search units 31-1 to 31-n (step S307). This processing includes a process for projecting and converting a 3D object serving as the associated information on the basis of the 3D position and posture of the information presentation terminal 10, as shown in FIG. 9(A). The processing also includes a process for projecting and converting a 3D object serving as the associated information on the basis of the 3D position and posture of the information presentation terminal 10 and locating near the input image 31 the 3D object reflecting only the posture component of the projection and conversion result, as shown in FIG. 9(B). The processing further includes a process for projecting and converting the 3D object serving as the associated information on the basis of the 3D position and posture of the information presentation terminal 10 and locating near the input image 31 the 3D object reflecting only the position component of the projection and conversion result, as shown in FIG. 9(C).

An output unit 16 then outputs the processing result of the information processing unit 15 to the user. (step S308). For example, if the processing result of the information processing unit 15 is a superposed image of the input image 301 and the associated information, the superposed image is displayed on the display.

On the other hand, if NO in step S304, the information presentation terminal 10 transmits the information input from the information input unit 11 to the server template matching unit 42 in the application server 40. The server template matching unit 42 performs template matching with the information using the template group stored in the connected server template storage unit 41 (step S309).

It is determined in step S310 whether matching in the server template matching unit 42 is successful. If NO in step S310, the processing is ended. However, if YES in step S310, it is determined in step S311 whether associated information is present. This processing is performed by the associated information search units 31-1 to 31-n in the content server 30. If YES in step S311, the associated information search units 31-1 to 31-n notify the information processing unit 15 in the information presentation terminal 10 of information representing that the associated information is contained in the unregistered content. On the basis of the received information, the information processing unit 15 generates information representing that the associated information is contained in the unregistered content (step S307).

If NO in step S311, the associated information search units 31-1 to 31-n notify the content server provider of information that a template which does not associate the content is present in the information obtained by the user (step S312).

The above operations make it possible to notify the user of the information presentation terminal 10 that information is present in a content not registered by the user, i.e., that useful information can be obtained by registration, in addition to the efficient use of the template storage unit 14 in the information presentation terminal 10 shown in the first embodiment. The user of the information presentation terminal 10 can reliably select useful contents.

In this embodiment, the use frequency of a template to which a content is not associated by a content provider can be known. As a consequence, a content associated with a template wanted by the user can be reliably prepared.

A practical application example of the second embodiment described above will be described below. The practical application of the second embodiment is, for example, a content display system using a cellular phone with a camera.

In this embodiment, the camera of the cellular phone photographs the location around the signboard 302, like the input image 301 shown in FIG. 8. Assume that the signboard 302 is not contained in the registered content, i.e., that a template corresponding to the signboard 302 is not present in the template storage unit 14 in the cellular phone.

In this case, the server template matching unit 42 performs template matching. If matching is successful and the associated information is present, the associated information search units 31-1 to 31-n notify the cellular phone that its content has the associated information, but the template cannot be used because it is unregistered. The user of the cellular phone can know that the content or template set wanted by the user is unregistered. For example, the user has photographed a signboard to obtain information associated with a fast food restaurant, but does not register the "fast food template set" yet.

When matching in the server template matching unit 42 is successful, but the associated information is absent, the content server 30 detects that its content is not made to correspond to the template requested by the cellular phone user, i.e., the customer for the content service.

The template matching unit 12 of the information presentation terminal 10 and the server template matching unit 42 of the application server 40 may simultaneously perform template matching. In this case, when matching is successful in the application server 40, but the user does not use the corresponding template, the user of the information presentation terminal 10 is notified of the information representing that information is present in an unregistered template set.

When information is present in an unregistered template set, the user of the information presentation terminal 10 may automatically transmit the corresponding template group from the template server 20.

The template groups may be classified depending on the circumferential conditions such as time and a spatial position, i.e., an indoor or outdoor position of the information presentation terminal 10. The template server 20 may automatically transmits an appropriate template group in accordance with the state of the information presentation terminal 10.

The case in which a still image servers as input information has been described above. Information such as a moving image or audio data may be similarly handled, as a matter of course.

According to the present invention, there can be provided an information presentation system with excellent system efficiency.

What is claimed is:

1. An information presentation system which includes a server and an information presentation terminal connected to the server via a communication channel and which uses template matching, comprising:
    an information input unit which inputs information serving as a target of the template matching;
    a template storage unit which stores a template group;
    a template matching unit which performs template matching between the information input from the information input unit and the template group stored in the template storage unit;
    a plurality of associated information search units which search for associated information on the basis of a matching result of the template matching unit;
    an information processing unit which processes output information in accordance with the information input from the information input unit, the matching result of the template matching unit, and a search result of the associated information search units;
    an output unit which outputs the information processed by the information processing unit;
    a template selection unit which causes a user to select a template group; and
    a template supply unit which transmits, to the template storage unit, the template group selected by the template selection unit from predetermined template groups,
    wherein the template supply unit is arranged independently of the plurality of associated information search units.

2. An information presentation system according to claim 1, wherein the template groups are classified depending on time and/or a position of the information presentation terminal.

3. An information presentation system according to claim 1, wherein the template groups are based on symbols which express at least a shop, facility, and a specific area, and classified in accordance with at least a function expressed by a symbol, a type of business, a type of user serving as a target.

4. An information presentation system according to claim 1, wherein the template supply unit automatically transmits the template group to the information presentation terminal in accordance with the time and/or the position of the information presentation terminal.

5. An information presentation system according to claim 1, wherein charging is made depending on supply of a template group from the template supply unit to the information presentation terminal.

6. An information presentation system according to claim 1, which further comprises
    a server template storage unit which stores a template group used in the information presentation system, and
    a server template matching unit which performs template matching between the information input from the information input unit and the template group stored in the server template storage unit, and
    in which the associated information search units search for the associated information on the basis of a result in the server template matching unit and transmits information corresponding to the search result.

7. An information presentation system according to claim 6, wherein when matching in the server template matching unit is successful and associated information search in the associated information search units is successful, the associated information search units transmit to the information presentation terminal information expressing that the associated information is present in a template not stored in the template storage unit.

8. An information presentation system according to claim 6, wherein when matching in the server template matching unit is successful and associated information search in the associated information search units fails, the associated information search units transmit to the information presentation terminal information expressing that a template to which information is not associated is present.

* * * * *